United States Patent [19]
Gebel

[11] 3,744,135
[45] July 10, 1973

[54] GAS SPRING FOR TRANSDUCER ON GAGING DEVICE

[75] Inventor: Kurt M. Gebel, Waynesboro, Pa.

[73] Assignee: Landis Tool Company, Waynesboro, Pa.

[22] Filed: Sept. 8, 1971

[21] Appl. No.: 178,807

Related U.S. Application Data

[63] Continuation of Ser. No. 824,433, May 14, 1969, abandoned.

[52] U.S. Cl. .............................. 33/169 R, 33/DIG. 2
[51] Int. Cl.. G01b 13/08, G01b 13/16, G01b 13/22
[58] Field of Search ....................... 33/169 A, 172 E, 33/172 C, 174 P, 174 PA, 174 PR, 174 A, 174 L, 178 E, 178 A, 178 C, 147 L, 147 N, 147 C, 143 L, DIG. 2

[56] References Cited
UNITED STATES PATENTS 2,603,043  7/1952  Bontemps ........................ 33/DIG. 2
2,348,643  5/1944  Poole ................................ 33/178 E

*Primary Examiner*—Harry N. Haroian
*Attorney*—Charles J. Diller et al.

[57] ABSTRACT

This disclosure relates to work gaging devices for machine tools in which gas under pressure maintains a sensing member in contact with a workpiece. It also includes a container for the gas having a volume substantially greater than the displacement of the sensing member of the gage so that gas pressure is not affected by movement of the sensing member. The container serves as a junction box for electrical components such as a gage signal amplifier and conductors, as well as the gas. The connection between the junction box and the gaging device is a single conduit for both the electrical conductors and the gas. In order to prevent escape of gas through the electrical conductors and conduits connecting the junction box and an associated machine control panel, the electrical conduits, at this point, include gas-tight plug connections.

8 Claims, 3 Drawing Figures

PATENTED JUL 10 1973 3,744,135

INVENTOR
KURT M. GEBEL
BY,
Diller, Brown, Ramik & Wight
ATTORNEYS

GAS SPRING FOR TRANSDUCER ON GAGING DEVICE

This application is a continuing application of my copending commonly assigned application Ser. No. 824,433, filed May 14, 1969 now abandoned.

This invention relates in general to gaging devices for machine tools, and more particularly to means for holding a movable member of the gaging device in engagement with a workpiece during a machining operation.

The usual means for holding a movable member of a gaging device in engagement with a workpiece is a spring bearing on the movable member. This arrangement is entirely satisfactory where the movable member has a range of only a few thousandths of an inch. On the other hand, when the movable member has a relatively great range of movement, the force exerted by a spring will vary considerably between the maximum and minimum diameter workpiece portions. This is particularly true where a sizing device is used to gage portions of a workpiece varying as much as 4 inches between the maximum and minimum diameter and wherein the movable member may have a range of one-half inch.

In view of the foregoing, it is, therefore, a primary object of this invention to provide means for holding the movable member of the gage in engagement with any of a full range of work diameters with a uniform pressure on all diameters.

Another object of this invention is to provide means for applying a gas under pressure for holding the movable member of the gage in contact with the workpiece.

Another object of this invention is to provide means whereby the gas pressure is not materially varied by movement of the movable member.

A further object of this invention is to utilize an electrical junction box or other previously utilized housing as a container for the gas.

Another object of this invention is to provide a gas tight conduit between the gas container and the gage with the conduit functioning both as a gas conduit and a housing for electrical connections extending between the gage and housing.

The apparatus of this invention particularly relates to the gage head of the gaging device for a machine tool. The gage head usually includes a movable member or sensing element which is held yieldingly in engagement with a workpiece and provides a signal to stop the machining operation when the workpiece has reached a specified dimension. The gaging device is intended to serve a relatively wide range of diameters on a single workpiece and the range of movement of the sensing element will be such that if a spring were utilized to exert the pressure thereon, the pressure would vary greatly between the maximum and minimum workpiece diameters. Accordingly, the apparatus of this invention provides means whereby a gas under pressure holds the sensing element in contact with the workpiece. The pressure of the gas is maintained constant in all positions of the sensing element by providing an available total volume of gas in use which is substantially greater than the volume of gas displaced by movement of the sensing element.

The supply of gas under pressure is contained in a junction box which also contains the electrical elements required for operation of the gaging device. The junction box is connected to the gaging device by a conduit through which both the gas and electrical conductors pass to the gage head. The electrical elements in the junction box are also connected to a machine control panel. In order to prevent leakage of gas from the junction box through the electrical conductors leading to the control panel, there is a gas-tight plug connection for each electrical conductor having one part in the junction box and the other on the conductor which connects the electrical elements with the control panel.

With the above and other objects in view that will hereinafter appear, the nature of the invention will be more clearly understood by reference to the following detailed description, the appended claims and the several views illustrated in the accompanying drawing:

Figure 1:
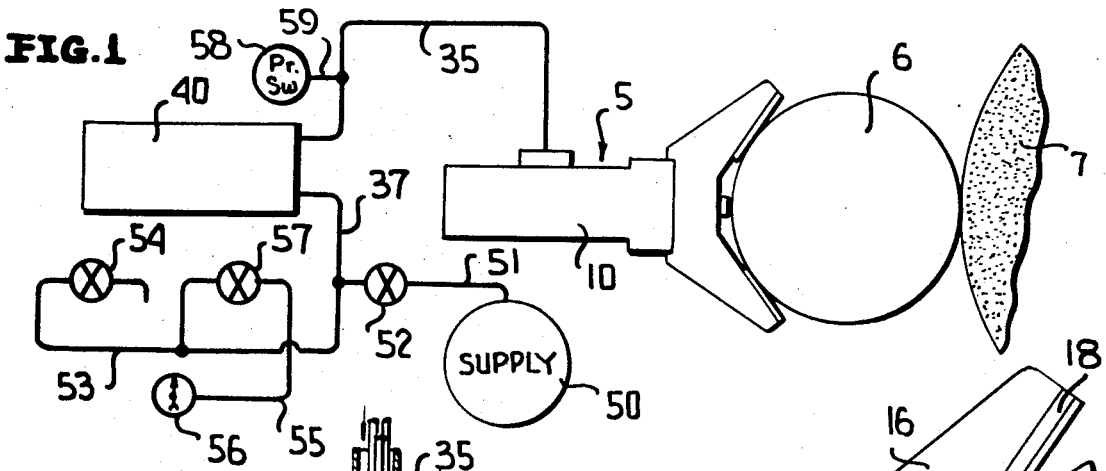
FIG. 1 is a schematic elevational view showing the gaging head in operative relation with respect to a workpiece and shows the specific gas supply therefor.

Referring first to FIG. 1 in particular, it will be seen that the gaging device of this invention is particularly illustrated as being part of a grinding machine although it may be equally as well utilized in conjunction with other machine tools. The gaging device includes a gage head, which is generally identified by the numeral 5 and which is illustrated in position for gaging the diameter of a workpiece 6 during a grinding operation being performed by a grinding wheel 7.

Figure 2:
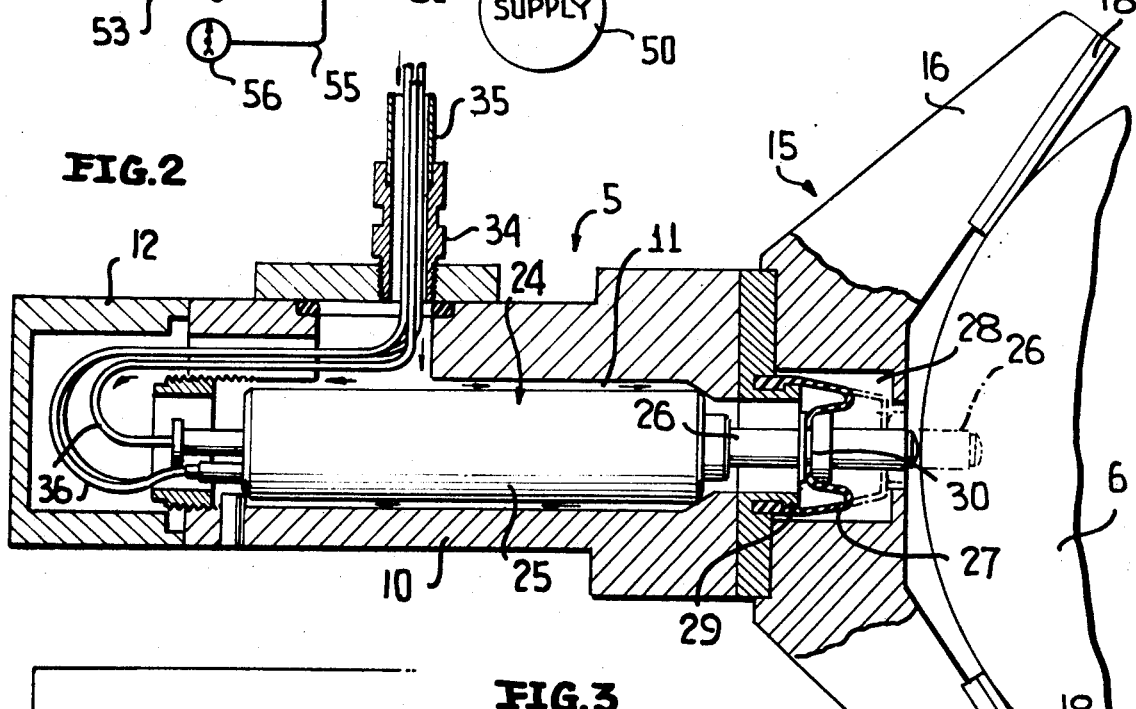
FIG. 2 is a vertical sectional view taken transversely of the machine tool through the gage head and shows the specific details of construction thereof.
Figure 3:
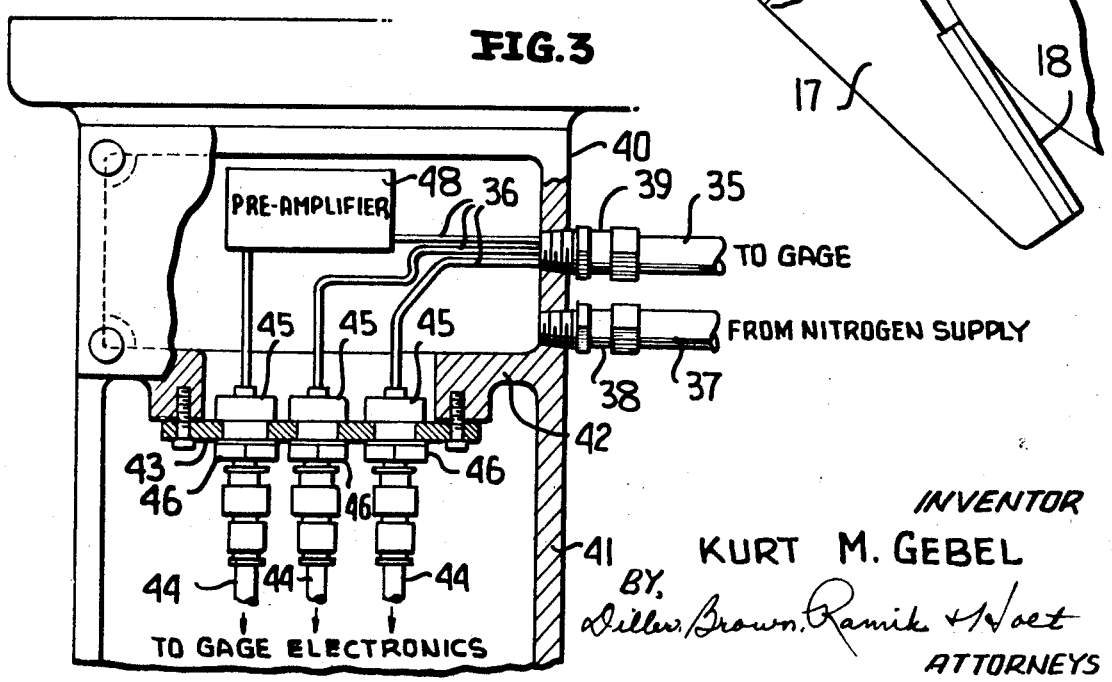
FIG. 3 is a partial front elevational view of a junction box and control panel with portions broken away and shown in section.

Referring now to FIG. 2, it will be seen that the gage head 5 includes a body 10 having a longitudinal bore 11 therethrough. At one end of the body 10 there is provided a removable end cap member 12 which is secured to the body 10 in sealed relation thereto in any conventional manner. At the opposite end of the gage body 10 there is mounted a conventional type of caliper, which caliper is generally identified by the numeral 15.

The caliper 15 has an upper arm 16 and a lower arm 17 which are disposed in angular relation to one another for the reception of a circular workpiece therebetween. Each of the arms 16 and 17 is provided with an elongated work engaging shoe 18.

The caliper 15 is arranged to accommodate a range of workpiece diameters. The minimum diameter workpiece would be tangent to the inner ends of the shoes 18, as is shown in FIG. 2, and the maximum diameter workpiece would be tangent to the outer ends of the shoes 18.

The gage head 5 includes a transducer, which is generally identified by the numeral 24. The transducer 24 is of a conventional type and includes a fixed member 25 which is suitably mounted within the body 10 within the bore 11. The transducer 24 also includes a movable member 26 which is slidably mounted within the fixed member 25.

The outer end of the movable member 26 is urged outwardly to engage the workpiece 6. This is accomplished by means of a flexible boot 27 which is disposed within an enlarged pocket 28 formed in a central portion of the caliper 15. The outer peripheral portion of the boot 27 is secured to a specially machine portion 29 in sealed relation thereto. The inner peripheral portion of the boot 27 is fixedly secured to an intermediate portion of the movable member 26 in sealed engagement therewith as at 30.

In accordance with this invention, gas under a relatively low, but controlled, pressure, is introduced into the body 10 and passes through the bore 11 to act on the boot 27, thereby advancing the movable member 26 into pressure contact with the workpiece 6. Gas under pressure is introduced into the body 10 through a conduit 35 which is coupled to the body 10 by means of a gas-tight fitting 34. It is to be noted that the conduit 35 also carries electrical conductors 36 which lead from the gage transducer 24.

The gaging device also includes a junction box 40 which is of a gas-tight construction. The conduit 35 is coupled to the junction box 40 by means of a fitting 39 which is of a gas-tight type. A suitable gas under pressure such as nitrogen, is supplied to the junction box 40 through a gas line 37 which is also coupled to the junction box by means of a gas-tight connector 38. After junction box 40 has been charged with gas at specified pressure, the supply is shut off. Recharging of the junction box 40 with gas is required only at long intervals.

It is to be noted that the junction box 40 is associated with and may be an integral part of a control panel 41. However, the interior of the junction box 40 is sealed relative to the control panel 41 so that the junction box 40, which is in the form of a sealed housing, may function as a gas container.

The junction box 40 has mounted therein a signal amplifier 48 which is electrically coupled in one of the coupling means or electrical conductors 36 leading from the transducer 24. In order that the conductors 36 may be coupled to the electronic components mounted within the control panel 41, a wall 42 of the junction box 40 is provided with a plate 43 which is secured thereto in sealed relation and which carries a plurality of plug receiving connectors 45. Electrical conductors 44 leading to the electronic components of the control panel 41 are provided with plug portions 46 which are releasably plugged into the connectors 45. It is to be understood that the conductors 36 are received in the connectors 45 in gas-tight relation.

Referring once again to FIG. 1 in particular, it will be seen that the junction box 40 functions as a displacement tank for the sealed pressurized gas system. Since the volume of the junction box 40 is greatly in excess of the volume displaced in the movement of the movable member 26 between its maximum retracted position, shown in solid lines in FIG. 2, and its maximum projected position, shown in dotted lines in FIG. 2, it will be seen that the variation in available gas space due to the movement of the movable member 26 will have no material effect on the pressure of the gas acting upon the flexible boot 27 to hold the movable member 26 in contact with a workpiece, such as the workpiece 6.

In order that the pressure of gas within the gas system and reacting on the boot 27 may be maintained at the desired pressure, there is associated with the junction box 40 a supply of the desired gas under pressure, the gas supply being identified by the numeral 50. A supply line 51 leads from the gas supply 50 to the line 37. A suitably valve 52 is mounted within the line 51 so as to control the supplying of gas to the junction box 40.

A vent line 53 is also coupled to the line 37 and opens to the atmosphere. Vent line 53 has incorporated therein a valve 54 for controlling the discharge of gas from the junction box 40.

In order that the gas system may have gas therein at the desired pressure, there is also coupled to the line 53 a gage line 55 which is connected to a pressure gage 56. If desired, the gage line 55 may have incorporated therein a valve 57 so that the gage 56 may be selectively rendered operative.

If desired, a suitable signal may be provided for indicating when the pressure within the gas system is other than the desired pressure. This may be accomplished by providing a pressure switch 58 which is coupled to the conduit 35 by means of a line 59.

Although only a preferred embodiment of the invention has been specifically illustrated and described herein, it is to be understood that minor variations may be made in the gage head construction and the gas system without departing from the spirit of the invention.

I claim:

1. A gaging device for a machine tool, said gaging device being particularly adapted for gaging workpieces of widely varying diameters and comprising
   a. a gage member, said gage member including
   b. a sealed body having an opening in one end thereof,
   c. a movable work engaging member mounted within said body and projecting therefrom through said opening,
   d. a yielding member exteriorly of said body hermetically closing said opening and being connected to said body and to said movable member for movement therewith,
   e. means for maintaining gas under pressure in said body for reaction against said yielding member to urge said movable member out of said body for controlled pressure engagement with a workpiece being gaged,
   f. and said movable member being returned into said body upon engagement of said member against said workpiece.

2. The gaging device of claim 1 wherein said gaging device includes
   a. a gage transducer mounted within said body, and
   b. said movable member is a movable element of said transducer.

3. The gaging device of claim 1 including
   a. a sealed remote housing,
   b. an amplifier in said housing
   c. coupling means extending between said movable member and said amplifier,
   d. a gas-tight conduit extending between and coupled to said body and said housing in sealed relation, and
   e. said housing forming a tank for gas under pressure having a volume substantially greater than the displacement of said movable member so that said movable member may move through its full range without a material change in gas pressure within said body.

4. The gaging device of claim 3 wherein said coupling means extend through said conduit.

5. The gaging device of claim 1 wherein said gaging device includes
   a. a gage transducer mounted within said body, b. said movable member is a movable element of said transducer,
c. a gas-tight junction box containing gas under pressure,
d. electrical conductors extending from said gage transducer into said junction box, and
e. conduit means for carrying both said conductors and said gas under pressure between said junction box and said body.

6. The gaging device of claim 5 together with
a. an electrical amplifier in said junction box, and
b. said electrical conductors connecting said gage transducer to said amplifier.

7. The gaging device of claim 6 together with
a. a machine control panel associated with said junction box, and
b. a connection between said amplifier and said control panel including a gas-tight plug connector, one part of which is on said junction box and the other part of which is on an electrical connecting member leading to said control panel.

8. The gaging device of claim 1 including
a. a sealed remote housing,
b. an amplifier in said housing,
c. coupling means extending between said movable member and said amplifier,
d. a gas-tight conduit extending between and coupled to said body and said housing in sealed relation,
e. said housing forming a tank for gas under pressure having a volume substantially greater than the displacement of said movable member so that said movable member may move through its full rang without a material change in gas pressure within said body,
f. a primary source of gas under pressure, and
g. piping and valving connecting said primary gas source to said housing for controlling the pressure of said gas within said housing.

* * * * *